UNITED STATES PATENT OFFICE.

JOSEPH BYSTRON, OF TESCHEN, AUSTRIA-HUNGARY, ASSIGNOR TO HIMSELF, AND KARL BARON VON VIETINGHOFF, OF BERLIN, GERMANY.

PROCESS FOR TREATING IRON-TANNED LEATHER.

1,061,597. Specification of Letters Patent. Patented May 13, 1913.

No Drawing. Application filed September 26, 1912. Serial No. 722,472.

*To all whom it may concern:*

Be it known that I, JOSEPH BYSTRON, a citizen of the Empire of Austria-Hungary, residing at Teschen, Bohemia, Austria-Hungary, have invented certain new and useful Improvements in Processes of Treating Iron-Tanned Leather, of which the following is a specification.

This invention relates to a process for treating leather tanned with iron salts with alkali salts, for instance, with common salt or sodium sulfate. The result of such a treatment is that more or less of the iron oxid contained in the leather is converted in the presence of iron salts into an insoluble basic salt of light color which in addition to the iron oxid also contains definite quantities of $SO_3$ or Cl in a chemically combined state. The reaction takes place according to the following equation:

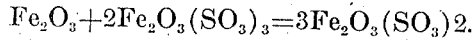

$$Fe_2O_3 + 2Fe_2O_3(SO_3)_3 = 3Fe_2O_3(SO_3)_2.$$

The advantage of such a conversion is due to the favorable physical properties of the yellow insoluble basic iron salt.

In contradistinction to iron oxid which is a glass hard and similarly brittle substance, the yellow insoluble iron salt is soft and mealy.

Leather which has only been tanned by means of iron oxid is just as brittle and moreover just as liable to crack as iron oxid itself. When, however, a suitable portion of the same is converted into the yellow insoluble basic iron salt, the favorable physical properties of the same become effective and a soft and elastic leather is the result of the treatment. The peculiar action of the alkali salts on the iron tanned leather is due on the one hand to the nature of the salt itself. Sodium sulfate for instance possesses these properties to a great extent, whereas common salt is not quite so effective in this respect, and the corresponding potassium salts are even less so. Further the action of the alkali salts also depends upon their quantity or concentration as that for instance, it is possible to obtain with common salt just as strong an action as with sodium sulfate, provided that a proportionately greater quantity of the former is used.

A characteristic feature of the yellow insoluble iron salt is that its formation requires some considerable time. Generally several hours are necessary for this purpose and the less there is of the particular salt the longer will be the formation process.

In carrying the process into effect, it is important that more or less of the alkali salt be incorporated in the iron tanned leather. This may be effected by fulling the leather with the concentrated salt solution or by simply coating it with the same and allowing it to sink in. The iron tanned leather may for instance be treated with a single or double quantity of sodium sulfate of 10 degree Baumé or with the same quantity of common salt of 25° Baumé, or the air dried leather is coated with solutions of such salts. Generally speaking the amount to be used depends upon the softness which it is desired to impart to the leather and the most suitable mixing proportions must be determined for each particular case. After some time, that is, after the alkali salt has exerted its action, it may be removed at the same time with the existing acid iron salts by washing the leather in water.

I claim:

The process herein described of treating leather tanned with iron salts, which consists in treating the leather with neutral alkali metal salt solutions.

In testimony that I claim the foregoing as my invention, I have signed my name in presence of two subscribing witnesses.

JOSEPH BYSTRON.

Witnesses:
ERNEST LILKS,
MILLI BALLERSTEINN.